United States Patent [19]

Nishiyama et al.

[11] Patent Number: 4,703,438
[45] Date of Patent: Oct. 27, 1987

[54] CHARACTER SIGNAL GENERATOR

[75] Inventors: Masaaki Nishiyama, Toyokawa; Atsuyuki Tanaka, Toyohashi, both of Japan

[73] Assignee: Minolta Camera Kabushiki Kaisha, Osaka, Japan

[21] Appl. No.: 706,738

[22] Filed: Feb. 28, 1985

[30] Foreign Application Priority Data

Mar. 1, 1984 [JP] Japan ................................ 59-40214

[51] Int. Cl.⁴ .................. G06F 15/40; G09G 1/06
[52] U.S. Cl. .................................. 364/519; 340/732; 340/750; 364/518
[58] Field of Search ............................... 364/515–522, 364/200 MS File, 900 MS File; 340/732, 733, 750; 400/7, 61, 63

[56] References Cited

U.S. PATENT DOCUMENTS 4,426,645  1/1984  Sakai et al. .................... 340/750
4,442,545  4/1984  Reitmeier et al. ............. 364/518 X
4,458,333  7/1984  Smith ............................ 364/519 X
4,548,520 10/1985  Ueno ............................. 364/518 X
4,554,637 11/1985  Kuntze ........................... 364/518
4,555,763 11/1985  Dahme ........................... 340/750 X
4,564,301  1/1986  Ueno ............................. 364/519 X
4,616,219 10/1986  Tanaka et al. ................. 340/750 X Primary Examiner—Errol A. Krass
Assistant Examiner—Kevin J. Teska
Attorney, Agent, or Firm—Price, Gess & Ubell

[57] ABSTRACT

A character signal generator which is capable of processing a large amount of data at a high speed without increase of the load of software and also capable of effectively using the storing region of text buffer by employing the circuit structure that the character codes to be output are continuously written on the text buffer and the row end code is written at the end of each row, thereby when this code is detected, the counting operation of address counter is suspended.

7 Claims, 7 Drawing Figures (A~Z character code
▨ space code)

CHARACTER SIGNAL GENERATOR

FIELD OF THE INVENTION

The present invention relates to a character signal generator to be used with a printer and more specifically to a character signal generator which uses a text buffer which can store an arrangement of characters to be output by a non-matrix system.

BACKGROUND OF THE INVENTION

A text buffer stores an arrangement of characters for input to a picture surface depending on character code and position information in a character signal generator. When a picture signal is output, such character codes are sequentially read and converted into the picture signal. In the prior art, for example, as shown in FIG. 1, the character codes have been arranged bi-dimensionally for storing in the memory corresponding to the arrangement of characters to be output for simplification of position information processing. Namely, the buffer memory is divided into M-region in the direction X in unit of character code (for example, 8 bits), this is arranged in N rows in the direction Y to form the M×N matrix. The character codes are arranged and stored within the M×N matrix corresponding to the character arrangement on the output picture.

A system where the character codes to be stored in the text buffer memory correspond to the character arrangement on the output picture is further capable of alleviating the task of software when the character code is converted to a dot matrix type picture signal because the memory address in the text buffer corresponds to the locations of characters on the output picture and can be generally employed for an apparatus such as a laser beam dot printer which is required to output the picture signal at a high speed.

However, this method is restricted in the number of characters to be stored in each row in the direction X and therefore has a disadvantage in that the number of characters to be stored in a row cannot be increased even when characters to be output become small in size. Moreover, this method has also a disadvantage in that, even when the character codes to be stored in each row in the direction X is less than the given number of divisions (M), a row must be completed by assigning the space code to the remaining storage area and accordingly the storage area is used inefficiently as compared with the number of characters stored actually and thereby efficiency in the use of memory is deteriorated.

Accordingly, the application profile of an existing text buffer is not sufficient for a current printer which processes a large amount of data at a high speed and is required to meet the versatility required by such printers, such as conversion in size of characters.

SUMMARY OF THE INVENTION

It is a main object of the present invention to provide a general purpose character signal generator which realizes, at a high speed, the processing of a great deal of data without any increase in the demands on the software.

It is another object of the present invention to provide a character signal generator which can effectively use the storing region of a text buffer.

It is further object of the present invention to provide a character signal generator having a constitution for continuously writing the character codes, to be output, to the text buffer and also writing the code indicating the end of a row at the trailing part of each row and suspending the counting operation of an address counter by detecting when such a row end code is read.

In order to attain the above and other objects, the present invention discloses, a character signal generator, comprising an address counter for designating the addresses corresponding to individual character code storing regions of a text buffer, a count signal generating means for inputting a count signal related to the output timing of picture data for said address counter, a code detector which is responsive to an output signal of said text buffer and outputs a detection signal when the specified carriage return code is output and discriminated, a carriage return signal count circuit which counts the output of said code detector and outputs the count signal to said address counter when the counted value reaches the specified count value, a latch circuit which receives the count data of said address counter and latches said count data when the load input signal is input, and a delay circuit which delays the count signal of said carriage return signal count circuit and outputs it as the load input signal of said latch circuit, wherein output of said latch circuit is loaded as the count start data of said address counter when the line scan start signal is output from a printer.

DETAILED DESCRIPTION OF THE INVENTION

Figure 1:
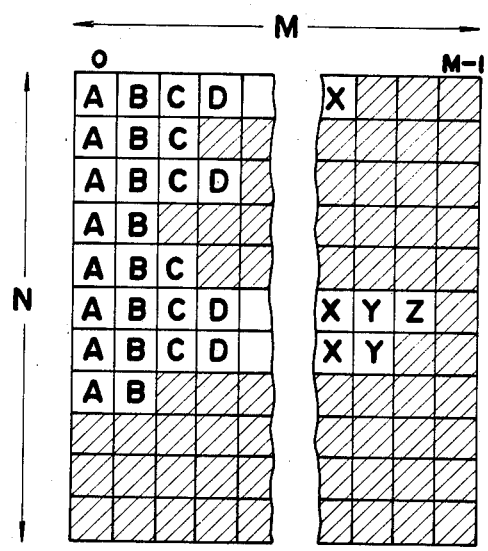
FIG. 1 is a schematic profile of character code storing condition of text buffer in the prior art system.
Figure 2:
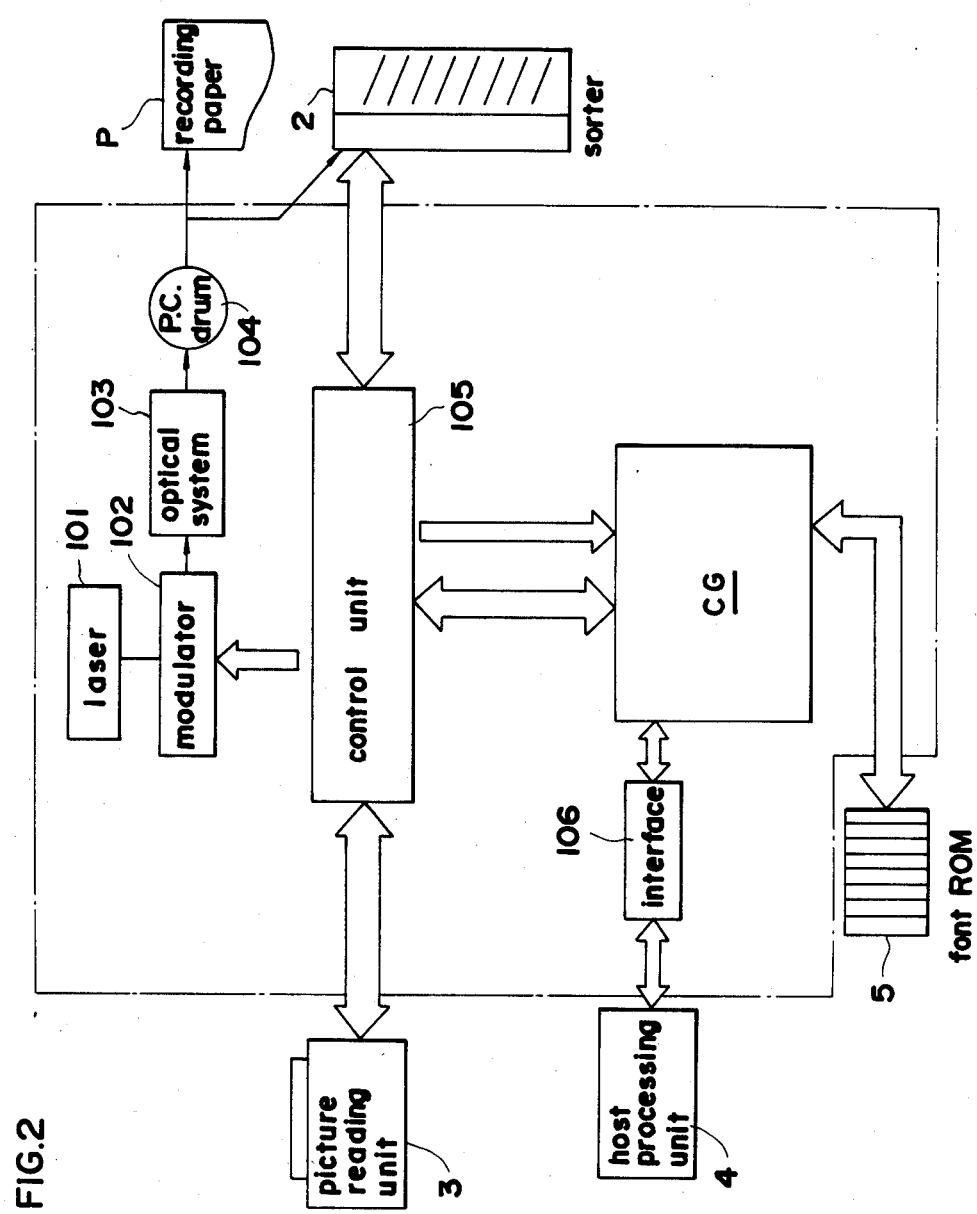
FIG. 2 is a block diagram for explaining signal processing procedures in a printer.

With respect to FIG. 2, the signal processing procedures of a printer (1) including the character signal generator (CG) are explained. From the technical viewpoint of the present invention, the mechanical structure of the printer (1) is not illustrated and explained. But in the following explanation, such a mechanical constitution is presumed in that the beam from the laser (101) is modulated with the picture signal, as explained later, by the modulator (102) and the beam is projected for scanning on the photosensitive drum (104) by the optical system (103) including a polygon mirror, etc. not shown and a printed picture is formed on a recording paper (P) by a well known electronic copying process. In the following explanation, an integrated unit of the laser (101), modulator (102) and optical system (103) is called by the general name of a print head.

The printing operation of printer (1) is adequately related with a sorter (2) and a picture reading unit (3) and is controlled by the control unit (105), as will be explained later. In case the printing operation is carried out on the basis of a picture signal read by the picture reading unit (3), the picture signal is stored in a memory or a picture is formed on the photosensitive drum (104) in synchronization between the reading operation and picture signal. The control unit (105) receives a picture signal from the character signal generator (CG) through a font ROM (5) and outputs it to the print head in a timed relationship with the mechanical operation of printer (1) for modulation of the laser beam. The character codes are stored in the text buffer of character signal generator (CG) together with address data and type of character (font) data from the host processing unit (4) through the interface (106). When the data such as a page is stored, the character signal generator (CG) sequentially reads the stored data from the specified memory chip of the text buffer in accordance with the timing signal and thereby the picture data signal is converted adequately to a dot signal and is output by the font ROM (5). Here, a host processing unit is a unit having the character processing functions such as a computer or word processor which is capable of processing a character signal. When required, the host processing unit outputs the print start command signal and the control unit (105) receives such a command signal and starts the operation.

Figure 3:
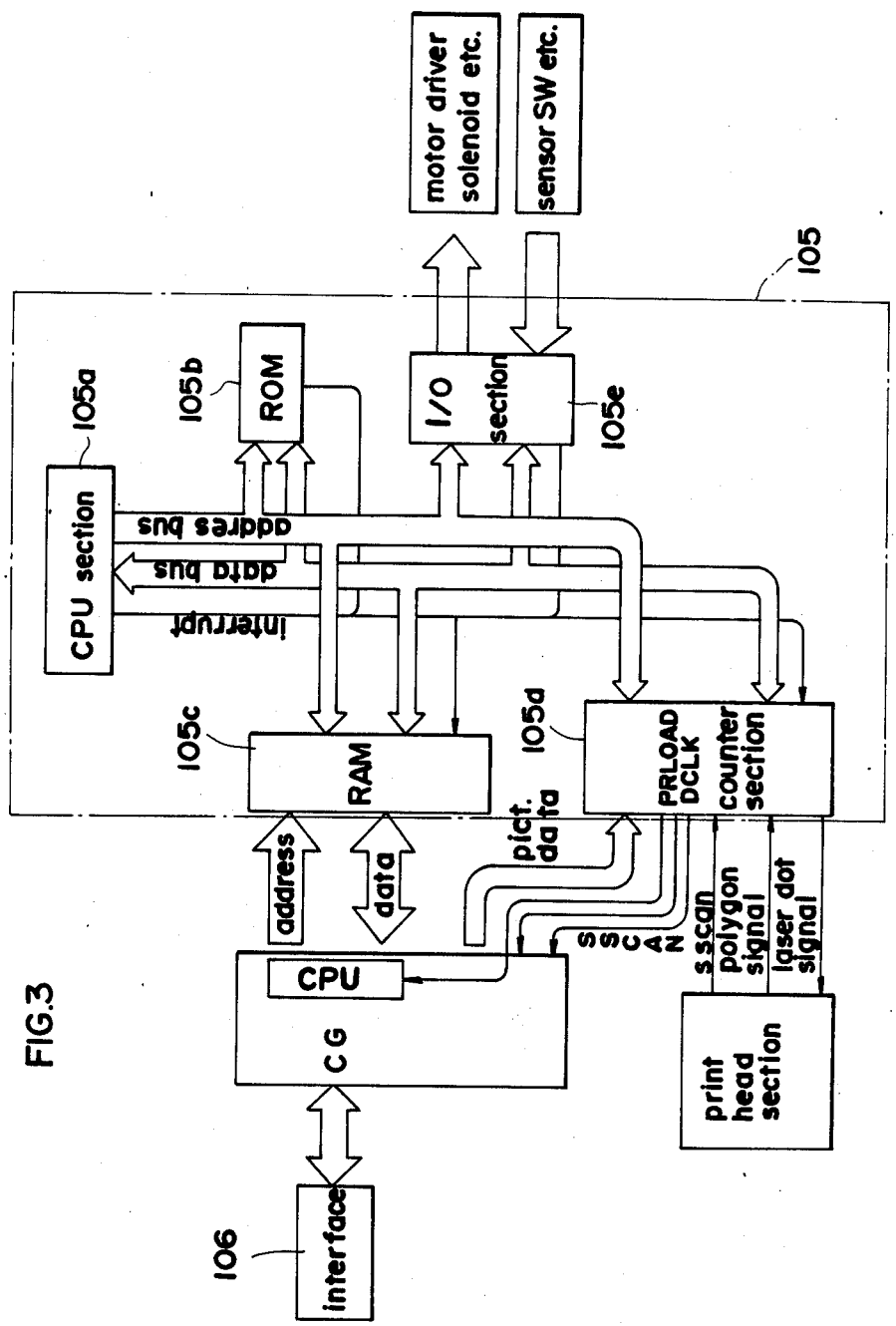
FIG. 3 is a block diagram indicating an input-output relationship between the printer control unit and the character signal generator.

FIG. 3 is a block diagram indicating a practical constitution of the control unit (105) and the relationship of input and output thereof.

The control unit (105) is composed of devices such as the CPU for controlling the printer (hereinafter referred to a MCPU) (105a), ROM (105b), RAM (105c), counter (105d) and input/output interface (105e) for internal units of printer (1), and these devices are related by the address bus, data bus and interrupt request line from MCPU (105a). From the interface (105c), the drive control signals for motor, clutch and solenoid, etc. within the printer (1) are output and the laser beam detection signal (line synchronization signal) and drum and paper position detecting signal are input thereto.

The character signal generator (CG) comprises a control CPU (hereinafter referred to as CGCPU) and this CGCPU provides access commonly to RAM (105c) in the control unit (105) with MCPU (105a) and is capable of sending or receiving data from/to MCPU (105a) through the common RAM (105c). The character signal generator (CG) receives the signal (PRLOAD) for designating the address of the first text buffer memory when the output processing for the dot clock signal, which specifies output timing of picture data from MCPU (105a) and the picture signal, explained later, is started through the counter (105d) and also receives the scan start signal (SSCAN) for line synchronization output when the sensor (not shown) detects the laser beam and the polygon mirror rotation detecting signal from the print head. The control unit (105) outputs a laser dot signal including picture data through the counter (105d).

Figure 4:
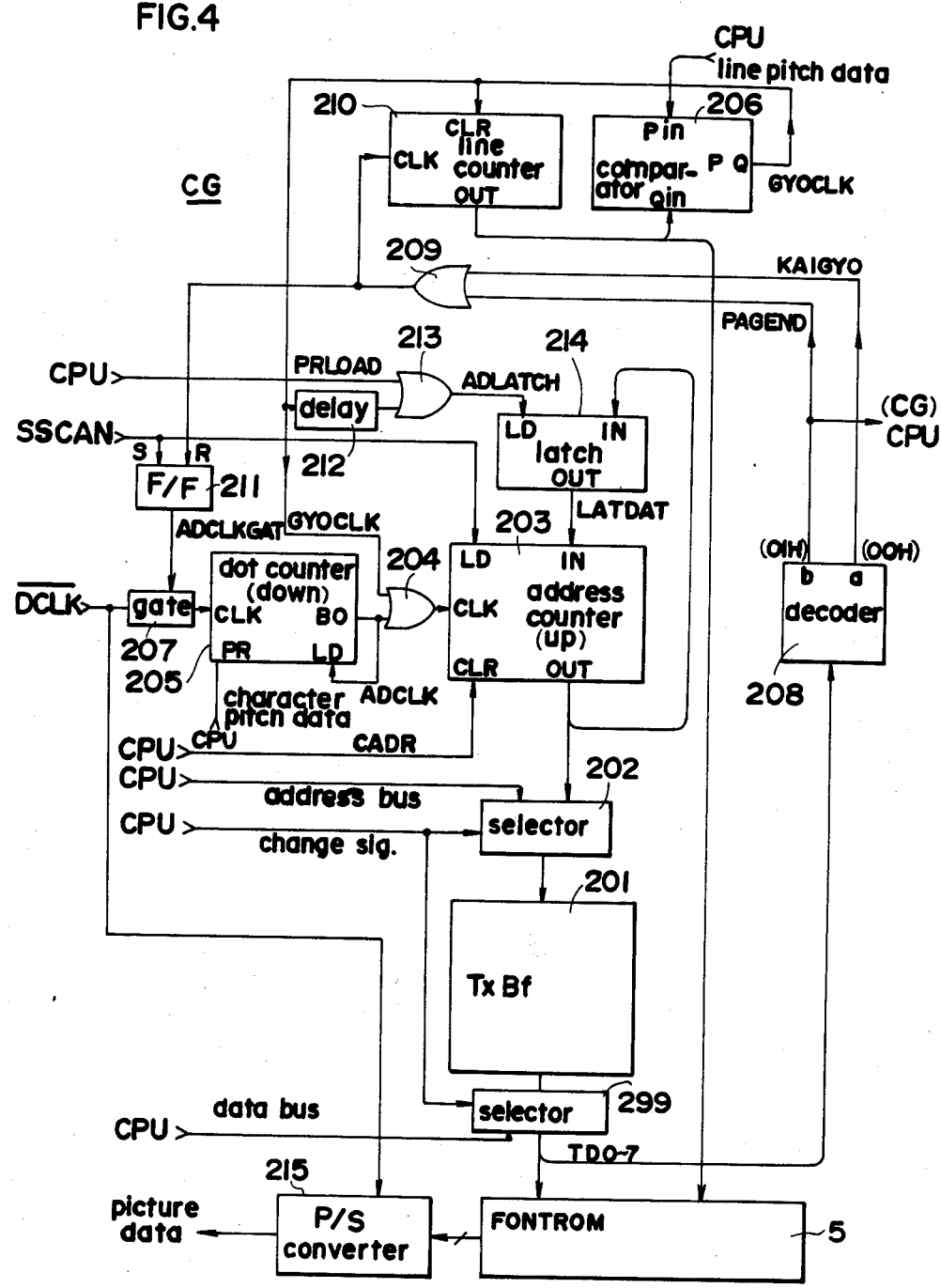
FIG. 4 is a schematic diagram indicating a character signal generator of the present invention.

FIG. 4 shows a block diagram of character signal generator (CG) of the present invention and the input-output relation thereof.

A text buffer (201) is a memory such as a programmable RAM to which character codes (for example, 8 bits) are input/output in parallel and given an address for each unit. Therefore, the character data is sequentially written or read by selecting the memory chip of a designated address, by inputting such address data to the text buffer (201) through the selector (202) and the write data through the selector (299), respectively. The selector (202) receives the addresses from the host terminal (4) through CGCPU while the character data is written, or receives the count output of address counter (203) while the character data is read and then inputs these signals selectively to the text buffer (201) in accordance with the selection signal sent from CGCPU.

The address counter (203) up-counts the pulses input to the count signal input terminal (CLK) and the data input to the data input terminal (IN) is preset as the initial value when the signal is input to the load input terminal (LD). The line scan start signal (SSCAN) sent from the print head is input to the load input terminal (LD). (CLR) is a clear address terminal for clearing the count content when the initialization signal (CADR) for an operation start is input. The outputs of dot counter (205) and comparator (206) are input to the count signal input terminal (CLK) through the OR gate (204).

The dot counter (205) is a presettable counter which receives the dot clock (DCLK) which specifies the output timing of picture data, explained later, sent from the control unit (105) through the gate (207) and issues a borrow for each input of dot clocks (DCLK) in such a number as corresponding to the character pitch data preset by CGCPU. The character pitch data specifies an output width of the characters predetermined by the selected font by the number of dot clocks (DCLK). The address counter (203) counts up "1" for each output (borrow) of dot counter (205) and then outputs the count value to the text buffer. The borrow (BO) output of dot counter (205) is further input to the load input terminal (LD) and the character pitch data is preset again in this timing cycle.

The text buffer (201) outputs character codes, during data reading, being stored in the region corresponding to the address which is input through the selector (202) and provides access to the font ROM (5) through the selector (299). The output data is also input to the decoder (208), which discriminates the carriage return code and page end code described later and then outputs respectively the output data (KAIGYO) and (PAGEND).

The page end signal (PAGEND) is input to CGCPU and the rest terminal of flip flop (211) which opens and closes the gate (207) of the line counter (210) and said dot clock (DCLK) through the OR gate (209), together with the carriage return signal (KAIGYO).

The line counter (210) counts up the carriage return signal and the page end signal and outputs the sum. The output is used for providing access to the font ROM (5) and is then input to the Q input of comparator (206). This data is compared with the line pitch data input to the P input of comparator (206) and when P=Q, the comparator (206) outputs the row clock signal (GYOCLK). The row clock signal (GYOCLK) is input to the address counter (203) through the OR gate (204) as explained above and also to the clear terminal (CLR) of line counter (210), clearing the line counter (210) for each output. Moreover, the row clock signal (GYOCLK) is then input to the load input terminal (LD) of latch circuit (214) through the delay circuit (212) and OR gate (213).

In the latch circuit (214), and address output of address counter (203) is input to the data input terminal (IN), when a signal (ADLATCH) is input to the load input terminal (LD) the address data is fetched and the output (LATDAT) is latched and sent as the input signal of the data input terminal (IN) of address counter. The signal (ADLATCH) to the load input terminal (IN) of this latch circuit (214) is output by said delay circuit (212) and the signal (PRLOAD) for initialization is output from CGCPU at the time of starting the picture data output processing.

The font ROM (5) is accessed by the character code sent from the text buffer (201) and the line data sent from the line counter (210) of the character signal generator and outputs in parallel the dot data of a designated line in the designated font of the designated character code. The parallel-serial converter (hereinafter referred to as P/S converter) (215) of the character signal generator (CG) outputs serially the parallel signal at the timing of dot clock (DCLK). This signal is output to the modulator (102) of print head through the counter (105d) of control unit (105) as the picture signal.

The write and read operations in the character signal generator (CG) are controlled in timing by CGCPU and are executed by receiving the synchronous signal sent from the control unit (105) and print head while the specified data are being set. Next, operations of character signal generator (CG) are explained by referring to the CGCPU.

The printer (1) enters the print-ready condition, for example, when the conditions, such as the fixing heater reaches the specified temperature, and there is no electrical or mechanical problems and the printing operation is not being executed, are satisfied. The control unit (105) detects such a condition and transfers the signal that the printer (1) is in the ready state to the host processing unit (4) through the CGCPU of the character signal generator (CG).

The print request is issued in the host processing unit (4) under this condition, CGCPU discriminates it (step 1 in FIG. 5) (hereinafter referred only to as S 1) and executes the writing processing of character data transmitted from the host processing unit (4) (S 2 to S 7). Namely, CGPU issues a command for selecting the address and data bus for writing to the selectors (202), (299) and sends the address code in the text buffer (201) and the character code to be written into the address to the address bus in accordance with the data sent from the host processing unit (4). At this time, the code for selecting a front may be given for each character or for each row and page.

Figure 6:
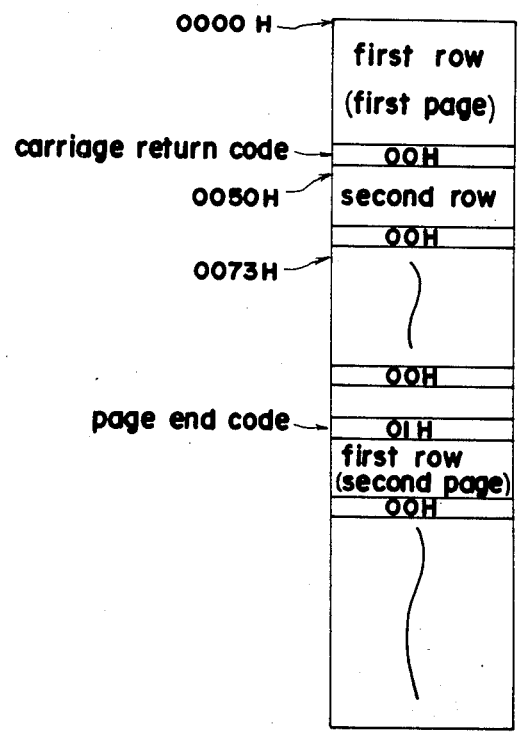
FIG. 6 is a schematic profile of the storing conditions of text memory buffer of the present invention.

Under this condition, the character data are written until the row end signal comes from the host processing unit (4). When the row end signal arrives, in the case of an existing method, the space code is written in the remaining rows during execution of a writing in the text buffer (201) and the address is designated for writing the next character data from the heading address of the next row. However, in the case of the present invention, as shown in S 4, when the row end signal arrives, the row end code (for example, 00H) vis written to the character code corresponding to the next address and the character codes of the next row are written into the text buffer (201) continuously together with the following address data. Accordingly, the heading character code of the second row is written in the address next to the row end code of the first row. At this time, the text buffer has a content as shown in FIG. 6, for example.

Data of each row is written as explained above and when the data to be printed out is completed in a single print operation, the page end signal is output from the host processing unit (4). Upon receipt of a page end signal, CGCPU writes the page end code (for example 01H) to the address position next to the final character code data in the text buffer (201) (S 7).

Figure 5:
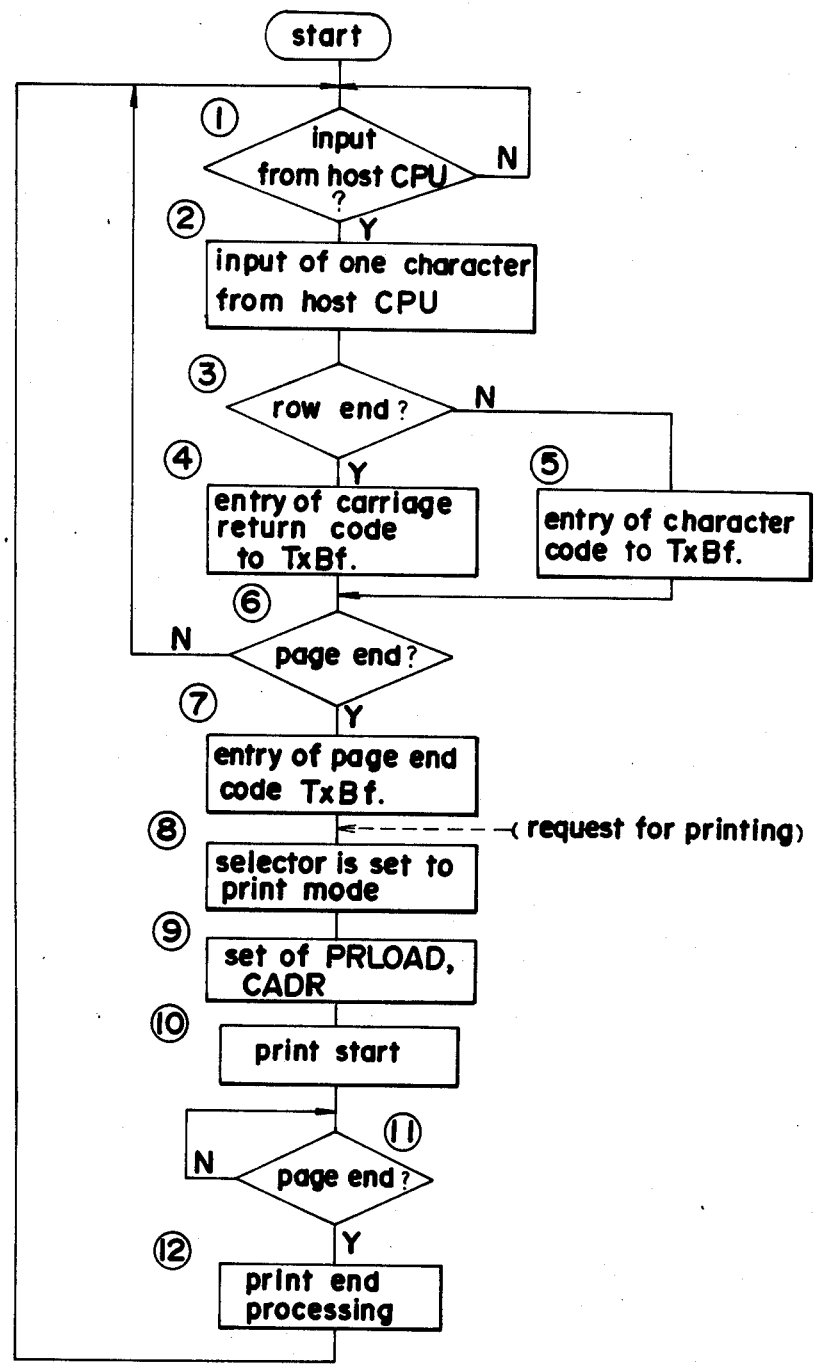
FIG. 5 is a flow chart indicating the software processing executed in the character signal generator.

In the processing shown in FIG. 5, the selectors (202), (299) are selected in the next step S 6 and the character data is read, namely "print execution mode" starts. But, it is also possible to provide a step for referring the remaining addresses of the next buffer (201) and to discriminate the existence or non existence of data in the second page and successive pages between S 7 and S 8 and thereby the process steps of S 1 to S 7 may be repeated in case a write area is still remaining in the text buffer (201).

As shown in steps S 9 to S 10, when the data written in the text buffer (201) is to be read, CGCPU directs the operation to the "read mode", changes the selection function of selectors (202), (299), outputs the signal for clearing address counter (203) for initialization and the load input signal (PRLOAD) of latch (214), and outputs the print operation start signal to the control unit (105). The character pitch data and line pitch data are output from CGCPU depending on the data during the writing operation.

When the signal (PRLOAD) is output, the OH gate (213) outputs the signal (ADLATCH) and thereby an output (0000H) of an address counter (203) is latched to the latch circuit (214).

When the printer (1) is started and the print head operates, the line scan start signal (SSCAN) is output from the sensor of the print head at the timing of the start of the first line scanning and it is then input to the load input terminal (LD) of address counter (203) through the control unit (105) and thereby the address counter (203) is initialized by the latch output (0000H) of the latch circuit (214). Moreover, the line scan start signal (SSCAN) is input to the set terminal of flip-flop (211), opening the gate (207) and the dot counter (205) and starts the counting of dot clock (DCLK).

Figure 7:
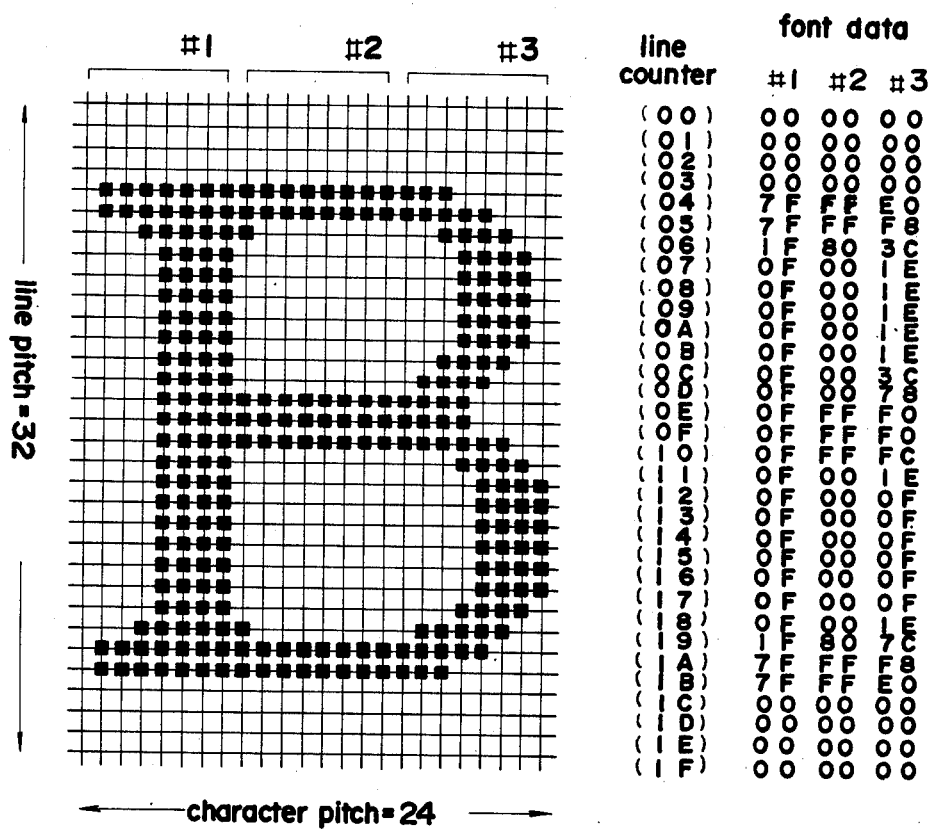
FIG. 7 shows a schematic profile of an example of dot arrangement of a front character.

On the other hand, an output (0000H) of an address counter (203) designates the address (0000H) of text buffer (201) through the selector (202), accesses the font ROM (5) by the pertinent character code and font code, and outputs, in parallel, the pertinent dot signal to the P/S converter (215) in accordance with the line designation (first, "0", namely the font first line) by the line counter (210). (Refer to FIG. 7).

When the dot clocks (DCLK) match the character pitch data (refer to FIG. 7), there is an output from the dot counter (205) and the address counter (203) counts up "1" throught the OR gate (204). Thereby, the address (0001H) of the text buffer (201) is designated, the font ROM (5) is accessed in accordance with the pertinent character code and font code as in the case of the first character and the dot pattern of the first row of designated character font is output to the P/S converter (215).

With a repetition of such processings, the pattern of a first line of character font is sequentially output through the addition of values of address counter (203) for each output of borrow from the dot counter (205). In this case, the P/S converter (215) outputs a parallel output of font ROM (5) in serial by the dot clock (DCLK) which specifies the dot pattern modulation timing by the laser beam. Thereby, the laser beam is modulated and the dot pattern is formed in accordance with the character arrangement on the photosensitive material.

When the value of an address counter (203) is added, since the row end code is written in place of the character code into the specified address position of text buffer (201) as mentioned above, the decoder (208) is so set that it outputs the carriage return signal (KAIGYO)

from the terminal (a) when such code is output. The output is input to the line counter (210) and the reset terminal of flip-flop (211) through the OR gate (209). Thereby, the line counter (210) adds the value, providing an output of "1". Meanwhile, since the flip-flop (211) is reset, the dot clock (DCLK) is not counted until the next line scan start signal (SSCAN) is input.

When the signal (SSCAN) is input, (0000H) is set again in the address counter (203) and the addresses are output sequentially from the heading address of the text buffer (201) and an output of line counter (210) is converted to "1" from "0" during the second line scanning and the dot pattern of a second line of each character font is output from the font ROM (5).

The line scanning is gradually executed by repeating this operation and when a count value of line counter (210) becomes equal to a value indicated by the line pitch data (refer to FIG. 7), the coincidence signal (GYOCLK) is output from the comparator (206), the line counter (210) is cleared, the address counter (203) counts up "1" and simultaneously such coincidence signal is input to the load input terminal (LD) of latch circuit (214) through the delay circuit (212). Accordingly, when the carriage return signal (KAIGYO) is output from the decoder (208) and the row signal (GYOCLK) is output from the comparator (206), the address counter (203) indicates the address next to the row end code, namely the count value indicating the address (0050H in the example of FIG. 6) corresponding to the bending character of the second row of character arrangement. When the load signal (ADLATCH) is output to the latch circuit (214) from the OR gate (213), an address signal is fetched and latched from the date input terminal (IN) of the latch circuit (214). A matching of the count value of line counter (210) and the line pitch data means completion of an output of a one row in the character arrangement. With an input of the next line scan start signal (SSCAN), the heading address of the second line of character arrangement is present to the address counter (203) and thereby a processing arrangement similar to that explained above is repeated for the character arrangement until the page end code is output from the text buffer (201).

When the page end code is output from the text buffer (201), the decoder (208) outputs the signal (PAGEND) from the terminal (b). The signal (PAGEND) is transmitted to CGCPU and also input to the line counter (210) and the reset terminal of flip-flop (211) through the OR gate (209), as in the case where the carriage return signal (KATGYO) is output from the decoder (208). When the puge end detection signal (PAGEND) is detected by CGCPU, as shown in S 11, S 12 of FIG. 5. MCPU (105a) and CGCPU of control unit (105) enter the processing for ending the printing operation. For example, input of the line scan start signal (SSCAN) and dot clock (DCLK) for the character signal generator (CG) is inhibited and the address counter (203) is prevented from operating even when the data of a next page is written in the successive addresses of text buffer (201).

The page end code is written in the text buffer (201) so that it is generally output when the count value of line counter (210) coincides with the line pitch data, namely when the output of a line of an output character arrangement is completed. Accordingly, the character signal generator (CG) enters the ready state when the flip-flop (211) is reset, the address counter (203) counts the value next to the address where the page end code is written and the lutch circuit (214) latches the count value of the address counter (203).

In case the data of the second and successive pages are written continuously in the text buffer (201), the above mentioned data writing is not carried out when the next print operation is possible. CGCPU immediately starts the operation from the S 8 of FIG. 5, provides access to the character signal generator (CG) in the ready condition by the process described above and starts the read operation from the heading address of the second page being latched to the latch circuit (214). However, in this case, any output of a clear address signal (CADR) in S 9 is inhibited.

It is also possible that a print ready signal is issued in the MCPU (105a) when the printer (1) enters the specified state during execution of a printer operation end processing due to the generation of page end detection signal (PAGEND), thereby S 1 is started and the data of a second page is written.

What is claimed is:

1. A character signal generator comprising:
   a text buffer having a plurality of storage regions for storing character codes or carriage return codes in designated addresses and for outputting the character codes or the carriage return codes stored in the designated addresses;
   a first signal generating means for generating a first signal relating to an output timing of picture data;
   a code detecting means for detecting the carriage return codes output from said text buffer and for generating a detection signal in accordance with the detection of the carriage return codes;
   a return signal count circuit for counting the detection signal and for generating a second signal when the count value of the return signal count circuit reaches a specified count value;
   an address counter for counting the first signal and the second signal and for outputting an address designating signal in accordance with the counted value of the first signal and the second signal, said address designating signal designating the address of said text buffer;
   a load signal generating means for generating a load signal at a specified time after the second signal is generated; and
   a latch means for latching the address designating signal when the load signal is generated and for inputting the latched signal into said address counter, said address counter treating the latched signal as a count start data.

2. A character signal generator comprising:
   a text buffer having a plurality of storage regions for storing character codes or carriage return codes in designated addresses and for outputting the character codes or the carriage return codes stored in the designated address;
   a font memory means for storing a plurality of character signals and for outputting a character signal corresponding to the character code output from said text buffer, said character signal comprising a plurality of dot signals;
   a timing signal generating means for generating a timing signal;
   a picture data control means for controlling output timing of said dot signals in accordance with the timing signal;
   a first signal generating means for counting the timing signal and for generating a first signal when the count value of the timing signal reaches a first count value;

a code detecting means for detecting the carriage return codes output from said text buffer and for generating a detection signal in accordance with the detection of the carriage return codes;

a second signal generating means for counting the detection signal and for generating a second signal when the count value of the return signal count circuit reaches a second count value;

an address designating means for counting the first signal and the second signal and for outputting an address designating signal in accordance with the counted value of the first signal and the second signal, said address designating signal designating the address of said text buffer;

a load signal generating means for generating a load signal at a specified time after the second signal is generated; and a latch means for latching the address designating signal when the load signal is generated and for inputting the latched signal into said address counter, said address counter treating the latched signal as a count start data.

3. A character signal generator as claimed in claim 2, wherein the number of said dot signals is m×n, in which m represents the number of dot signals in the lateral direction of a character and n represents the number of the dot signals in a longitudinal direction of a character.

4. A character signal generator as claimed in claim 3, wherein said first count value is m.

5. A character signal generator as claimed in claim 4, wherein said second count value is n.

6. A character signal generator as claimed in claim 2, further comprising a rate means for blocking the timing signal output from the timing signal generating means to the first signal generating means.

7. A character signal generator as claimed in claim 6, wherein said blocking means blocks the timing signal in response to the detection signal.

* * * * *